(12) United States Patent
Desmarais

(10) Patent No.: US 9,027,891 B2
(45) Date of Patent: May 12, 2015

(54) FLOOR PROTECTORS FOR FURNITURE LEGS AND CASTERS AND METHODS OF MAKING AND USING SAME

(76) Inventor: Pierre Desmarais, Cantley (CA)

( * ) Notice: Subject to any disclaimer, the term of this patent is extended or adjusted under 35 U.S.C. 154(b) by 808 days.

(21) Appl. No.: 13/235,239

(22) Filed: Sep. 16, 2011

(65) Prior Publication Data

US 2012/0068034 A1     Mar. 22, 2012

Related U.S. Application Data

(60) Provisional application No. 61/383,572, filed on Sep. 16, 2010, provisional application No. 61/383,577, filed on Sep. 16, 2010.

(51) Int. Cl.
   *A47B 91/00*          (2006.01)
   *B60B 33/00*          (2006.01)

(52) U.S. Cl.
   CPC ........... *B60B 33/0028* (2013.01); *Y10T 16/216* (2015.01); *Y10T 29/49826* (2015.01); *B60B 33/0042* (2013.01); *B60B 2310/316* (2013.01); *B60B 2900/521* (2013.01); *B60B 2900/531* (2013.01)

(58) Field of Classification Search
   CPC ............ Y10T 16/216; Y10T 29/49826; Y10T 33/0042; Y10T 33/0028; B60B 2310/316; B60B 2900/521; B60B 2900/531
   USPC ........ 248/188.8, 188.9, 188.91, 346.2, 346.3, 248/346.11
See application file for complete search history.

(56) References Cited

U.S. PATENT DOCUMENTS

| | | | |
|---|---|---|---|
| 2,699,310 A * | 1/1955 | Evans | 248/188.9 |
| 2,865,133 A | 12/1958 | Hoven et al. | |
| 5,074,023 A | 12/1991 | Decker et al. | |
| 6,405,982 B2 | 6/2002 | Ferencz | |
| 6,626,405 B1 | 9/2003 | Keast et al. | |
| 6,647,589 B1 * | 11/2003 | Youngwith | 16/18 CG |
| 6,754,934 B1 | 6/2004 | Shiffler | |
| 7,124,986 B1 | 10/2006 | Bailey | |
| 8,028,374 B2 * | 10/2011 | Lang | 16/42 R |
| 8,181,923 B2 * | 5/2012 | Verdelli, Jr. | 248/188.9 |
| 2002/0190179 A1 | 12/2002 | Rydell et al. | |
| 2003/0163894 A1 | 9/2003 | Jones et al. | |

(Continued)

OTHER PUBLICATIONS

Nelco Advertisement, Thomas Register, p. 44740-44741, Pub. Date 2000, Thomas Publishing Company, Five Penn Plaza, New York, NY 20001.†

(Continued)

*Primary Examiner* — Gwendolyn Baxter
(74) *Attorney, Agent, or Firm* — Ridout & Maybee LLP

(57) ABSTRACT

To facilitate installation of a floor protector to a furniture leg or a caster for movable objects, shrinkable tubing, for example heat-shrink tubing, is used to secure the floor protector to the leg or caster. A tube of heat-shrink material may have at normal temperatures a predetermined unshrunk cross-sectional size large enough to permit the tube to receive the foot portion or caster circumference and a shrinkage ratio sufficient for the tube to be shrunk to a cross-sectional size that is smaller than the foot portion or caster circumference so that, when the tube is shrunk by application of heat or other suitable means, the tube will conform and be secured to the underlying foot portion or caster. Hot-melt adhesive may be applied to the interior of the floor protector and the heat applied to shrink the tube may melt the adhesive to adhere the floor protector to the foot portion or caster.

27 Claims, 3 Drawing Sheets

(56) References Cited

U.S. PATENT DOCUMENTS

| | | |
|---|---|---|
| 2004/0123421 A1 | 7/2004 | Bushey |
| 2005/0003723 A1 | 1/2005 | Brouard et al. |
| 2005/0081330 A1 | 4/2005 | Edwards |
| 2005/0115022 A1 | 6/2005 | Desmarais |
| 2007/0062001 A1 | 3/2007 | Bushey et al. |
| 2007/0220703 A1 | 9/2007 | LaPointe et al. |
| 2007/0234507 A1 | 10/2007 | Vorphal |
| 2008/0148522 A1 | 6/2008 | Beshore |
| 2008/0179471 A1 | 7/2008 | Verdelli |
| 2008/0209686 A1 | 9/2008 | Lang |
| 2008/0258023 A1 | 10/2008 | Desmarais |
| 2012/0061545 A1* | 3/2012 | Schneider .......... 248/345.1 |

OTHER PUBLICATIONS

CANUSA Advertisement, Thomas Register, p. 44752, Pub. Date 2000, Thomas Publishing Company, Five Penn Plaza, New York, NY 20001.†

\* cited by examiner
† cited by third party

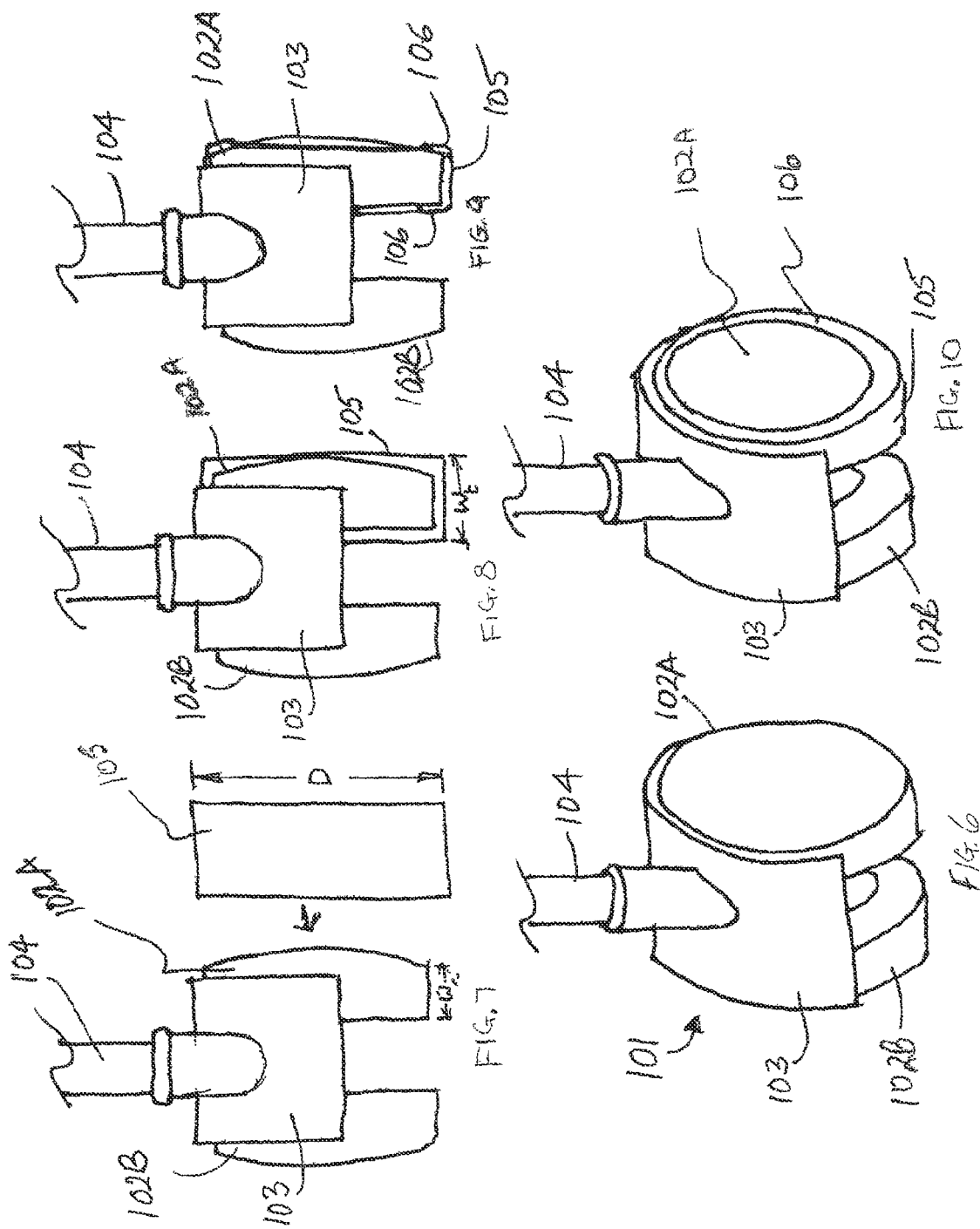

FLOOR PROTECTORS FOR FURNITURE LEGS AND CASTERS AND METHODS OF MAKING AND USING SAME

CROSS-REFERENCE TO RELATED APPLICATIONS

This application claims priority from U.S. Provisional patent application Ser. No. 61/383,572 filed Sep. 16, 2010, the entire contents of which are incorporated herein by reference. This application also claims priority from U.S. Provisional patent application Ser. No. 61/383,577 the entire contents of which are incorporated herein by reference. This application is related to U.S. patent application Ser. No. 12/082,054 filed Apr. 8, 2008, the entire contents of which are incorporated herein by reference.

FIELD OF THE INVENTION

This invention relates to furniture leg floor protectors, and, more particularly, floor protectors for use with legs of chairs, tables, stools, sofas, room dividers, or any other furniture having legs (hence feet) to protect the floor when the furniture is moved, whether by sliding or rocking.

This invention also relates to floor protectors for use with casters of caster units for attaching, or attached, to a movable object to protect the floor when the object is moved. Examples of such objects include furniture, such as beds, chairs, tables, desks, privacy screens, room dividers, partitions and storage cabinets for files; and other objects such as equipment stands, display stands, trucks, carts, trolleys, and so on.

In this specification the term "caster unit" embraces one or more casters rotatably mounted in or on a support frame that is attachable by a swivel to the movable object. Such a castor may be disc-, ball- or barrel-shaped and sometimes is called a "caster wheel", especially when dish-shaped.

BACKGROUND OF THE INVENTION

Furniture leg floor protectors have been in use for many years to avoid damage to the floor when a piece of furniture is moved. They also reduce noise in the classroom where children move their desks and chairs around often making an irritating noise.

Some known floor protectors for furniture legs comprise a disk of synthetic plastics material, or metal, which can be fixed to the end of the leg by adhesive or a screw. Attached to the underside of the disk is a pad of felt or other suitable protective material which contacts the floor. For example, US 2005/0003723 (Brouard et al.) discloses floor protectors for fastening to the underside of the foot of the leg by adhesive or by a hook-and-loop fastener (e.g., Velcro™), so that it can be replaced more easily. US 2008/0148522 (Beshore), as another example, discloses a three-part floor protector which comprises an inverted cup for securing by its base to the furniture leg by means of a screw. Engaged in the inverted cup are a glide of non-abrasive synthetic plastics material and an interposed resilient washer. US 2007/0234507 (Vorpahl) discloses yet another example in the form of a glide assembly which has interchangeable hard and soft bases and several attachment devices which can be adapted to the foot of the furniture leg and the type of floor.

Sometimes, it is not practical or desirable to fasten the floor protector using a screw fastener or adhesive. For metal or plastics furniture legs having an enlarged foot portion, perhaps in the form of a disk or toroid, or even an adjustable foot or glide fastened by a screw, it is known to use a slip-on floor protector in the form of a unitary boot of rubber or synthetic plastics material which fits over the foot/glide and grips its upper surface. The boot may itself contact the floor or may carry a pad of felt or other protection material. Examples of slip-on floor protectors are disclosed in U.S. Pat. No. 2,865,133 (Hoven et al.), U.S. Pat. No. 6,405,982 (Ferencz), and U.S. Pat. No. 6,754,934 (Shiffler).

It is also known to use a slip-on floor protector which is generally in the form of a ball with a slit in the top, as disclosed, for example, in US 2007/0220703 (LaPointe et al.). The end of the furniture leg is inserted into the ball so that its foot rests on the interior of the bottom of the ball and the sides of the slit grip the furniture leg.

Because these slip-on floor protectors are relatively short, they may become dislodged relatively easily, especially when used in schools where chairs may be rocked as well as dragged. Also, the boot or ball may be considered to be unsightly.

It is known to use a floor protector having not only a boot portion to fit around the foot of the leg but also an integral tube which will extend upwards along the leg and grip the surface of the leg above the foot. US 2008/0179471 (Verdelli), for example, discloses a tube which is secured to the furniture leg by means of elastic bands or by ribbon or string tied around it. US 2008/0209686 (Lang) also discloses a floor protector secured to the foot or leg by a tie. In one embodiment, the protector has a tube closed at one end (which contacts the floor) and a tie wrapped around portions the tube near its other end to fasten it tightly to the leg. In an alternative embodiment, the tie passes through upstanding flanges of a boot to draw them closed over the upper surface of the foot. The use of ties may not be acceptable because they may come undone and may be unsightly.

Some floor protectors rely, at least primarily, upon elasticity of the sleeve to grip the leg of the furniture. For example, U.S. Pat. No. 7,124,986 (Bailey) discloses a floor protector comprising an elastomeric sleeve with one end closed, at least partially, to form a bottom to which is glued or stitched a pad of felt or other protective material. The sleeve can be stretched to fit onto the furniture leg. US 2004/0123421 (Bushey) discloses a floor protector comprising a hemispherical base and a sleeve for fitting around the furniture leg. The sleeve has resilient projections in the form of splines, flutes or leaves, which extend radially inwardly to grip the leg. These projections may complicate manufacture yet not provide adequate grip, especially when the protector has been in use a long time and repeated flexing and aging have reduced the elasticity of the sleeve. Similarly, US 2004/0123421 discloses a floor protector with a corrugated sleeve having folds therein to increase friction. It would appear, however, that the complexity of the molding process could make this option uneconomical.

US 2005/0115022 (Desmarais—present inventor) discloses a floor protector having a sleeve with internal splines to grip the leg. The problem of stretching and enlargement of the sleeve, causing it to loosen was addressed by means of a flexible coupling between upper and lower portions of the sleeve, allowing the leg to tilt while the pad beneath the foot of the leg remained flat upon the floor. Nevertheless, this approach too is not entirely satisfactory because it entails a rather complicated, hence costly, molding configuration.

The trade-off between ease of installation of a floor protector having an elastomeric sleeve and the security of the grip between the sleeve and the furniture leg, especially after the furniture has been dragged or tilted repeatedly during normal usage, was addressed in the present inventor's United States published patent application No. 2008/0258023, which discloses a floor protector having a sleeve which is more elastic at the top than at the bottom. This upper portion can be stretched enough to allow it to be rolled outwards, the leg/foot inserted into the less-elastic lower portion, and the upper portion unrolled onto the leg. Rolling up the stretchable upper sleeve portion facilitates installation, while the stiffer lower sleeve portion firmly grips the lower portion of the leg and provides good stability of the floor-engaging pad. Nevertheless, this arrangement may not be entirely satisfactory if fitted to heavy furniture or, in the case of an occupied chair, tilted and/or dragged, subjecting the sleeve to excessive stress.

The need to protect floors may also arise where the furniture or other movable object is equipped with caster units for ease of movement. In the home or a hospital setting, for example, such caster units may be fitted to beds. In the office setting, many office chairs are mounted upon a pedestal having, typically, five legs each with a caster unit. Some caster wheels are made of hard black synthetic plastics material, for example polyurethane, which may leave marks upon, or physically damage, certain types of flooring. It is known to provide plastic mats beneath such office chairs both to protect the floor and, in some cases, guard against the build-up of static electricity. Disadvantages of such mats, however, is that they are relatively expensive, unsightly and may impair movement of the chairs.

It is known to equip the caster with a cover of relatively soft material which is less likely to cause damage to, or mark, the floor. For example, Products of Maximus LLC markets a caster tire cover under the trademark CasterBooties which involves a leader strap to pull the cover onto a caster in the form of a wheel, an elastic band each side to hold the cover onto the caster, an over flap, an under flap, and Velcro™ fasteners. According to their web site at http://www.tirebooties.com/CasterBooties_Caster_Tire_Covers.html, in addition to being complicated, the cover is not recommended for steel caster wheels or dual wheels and will not fit on casters with wheel brakes. (cf. web page appended to this description.)

United States patent publication No. 2007/0062001 (Bushey et al.) discloses a caster wheel cover comprising a generally cylindrical floor-engaging member having sidewalls projecting from opposite edges to define a channel which receives the outer surface portion of the caster wheel. The cover is installed by wrapping it around the circumference of the caster wheel. In one embodiment, the cover can be opened and closed, like a bracelet, to enable it to be fitted onto the caster wheel. In another embodiment, the cover is a complete circle and one sidewall has notches to allow it to flex and facilitate installation of the cover. Yet another embodiment is a complete circle but with no notches; instead the inner surfaces of the sidewall are laterally spaced from respective sides of the wheel. Such a caster wheel cover in the form of a complete circle, without notches, is marketed by Expanded Technologies LLC under the trademark CasterTire™. According to installation instructions on their web site at http://www.expandedtechnologies.com/caster_tire_inst.html, (cf. web page appended to this description) their caster tire is installed in much the same way that a car tire is installed, using a tire lever to pry the tire over the wheel. The installation instructions include a tip, namely "If having trouble with installation, try placing tires in a bucket of hot tap water. The hot water will make the tires more pliable and easier to install."

There remains a need, therefore, for a floor protector for a caster that not only is durable and secure once installed, but also can be installed easily and, once worn, replaced easily.

An object of the present invention as applicable to furniture leg floor protectors is to overcome or at least mitigate the above-described deficiencies of such known floor protectors, or at least provide an alternative furniture leg floor protector which combines ease of installation with security once it has been installed.

An object of the present invention as applicable to casters of caster units is to overcome or at least mitigate problems associated with caster covers or tires and to provide a floor protector for casters which combines ease of installation with a secure grip once it has been installed.

To this end, embodiments of the present invention employ shrinkable tubing, for example, heat-shrink tubing, to secure the floor protector directly or indirectly to the leg or caster.

According to the present invention, therefore, there is provided a floor protector having a tube of shrinkable material sized to fit onto a leg portion of a furniture leg or a circumferential surface of a caster attached or attachable to a movable item, the shrinkable material having a shrinkage ratio such that, when shrunken by the application of heat or ultraviolet radiation or by other means, the tubing grips the leg or caster to secure the floor protector thereto.

In this specification, the term "unshrunk" tube/tubing will be used to describe the condition of the tube/tubing before it has been shrunk during installation, and the word "shrunken" will be used to describe the tube/tubing after it has been shrunk. This does not preclude, however, the tube/tubing having been shrunk partially down to the "unshrunk" size before installation commences.

According to a further aspect of the present invention, there is provided a floor protector adapted for use with furniture having at least one leg with a foot portion, the floor protector comprising a tube of shrinkable material that can be shrunk by application of heat, or by other suitable or appropriate means, the tube having at normal room temperatures a predetermined unshrunk cross-sectional size large enough to permit the tube to receive said foot portion and a shrinkage rate sufficient for the tube to be shrunken to a cross-sectional size that is smaller than the foot portion so that, when the tube is placed over the foot portion and shrunken by application of heat or by other means as aforesaid, the tube will conform to and grip the underlying foot portion and secure the floor protector to the foot portion.

According to another aspect of the present invention, there is provided a method of installing a floor protector onto a foot portion of a furniture leg, comprising the steps of fitting over the foot portion a tube of shrinkable material that can be shrunk by application of heat or by other suitable or appropriate means, the tube having a predetermined unshrunk cross-sectional size large enough to receive the foot portion, the shrinkable material having a shrinkage ratio sufficient for the tube to be shrunk to a size smaller than a cross-sectional size of the foot portion, and the step of shrinking the tube by application of heat or by other suitable or appropriate means to cause the tube to shrink at least until the tube has conformed to the underlying surface of the foot portion to such an extent as to grip the foot portion and secure the floor protector to said foot portion.

Preferably, the shrinkable tube is made of heat-shrink material, i.e. a thermoplastic material which shrinks when heated. It is known to use heat-shrink tubing in the electrical industry around connections between electrical conductors and between electrical conductors and terminals, to provide insulation, abrasion resistance and environmental protection. Suitable heat-shrink materials may shrink to as little as one third or one quarter of their original size and may shrink at temperatures which can be obtained using a heat source that is relatively readily available, such as a small butane torch, an electrical hot air heat gun, a paint-stripper or a hair dryer. Generally, commercial hand-held hair driers would be preferred because domestic hair dryers operate at lower air temperatures than commercial hair driers, which limits their use with heat-shrink materials that are commercially available at this time. Nevertheless, use of a domestic hair dryer or other heat source is not precluded if it can provide the required flow of air at a sufficiently high temperature.

According to yet another aspect of the invention, there is provided a method of making a floor protector adapted for use with furniture having at least one leg with an end having a width smaller than a girth adjacent the end, the floor protector comprising a tube of shrinkable material that can be shrunk by application of heat, or by other suitable or appropriate means, the method comprising providing a preform comprising a base portion and an integral tube portion, the cross-sectional size of the tube portion being significantly less than the cross-sectional size of the base portion, and stretching the tube portion to a size sufficient to accommodate said girth.

In embodiments of the foregoing aspects of the invention, at least part of the interior of the tube may be provided with an adhesive so that, once the tube has been fully shrunk, the adhesive bonds the tube to the foot portion and provides additional security against the floor protector being dislodged. Where the tube comprises heat-shrink material, the adhesive may be heat-sensitive (hot-melt) adhesive arranged to melt at a temperature similar to that required to shrink the tube; the hot-melt adhesive being melted (activated) contemporaneously with the shrinking of the tube, i.e., using the same heat source. Once cooled, the adhesive assists in securing the floor protector to the foot portion.

Preferably, the shrinkable tube is installed onto a foot portion having a non-uniform profile, i.e., having lateral protrusions, so that, once the tube has been shrunk, the tube conforms at least partially to the protrusions and provides mechanical resistance to forces acting in the direction of the tubular axis to that would tend to dislodge or remove the floor protector, at least partially.

In preferred embodiments of either aspect of the invention the unshrunken tube is partially or completely closed at one end which carries a pad of protective material, the unshrunken tube being greater in cross-sectional size than the foot portion of the furniture leg and having a length predetermined such that when the tube has been shrunken onto the furniture leg foot portion, a desired grip or frictional force between the tube and the leg or foot portion is sufficient to hold the tube and pad onto the foot portion.

Preferably, the pad is embedded partially into the material of the closed end of the tube, the material of the tube bottom infusing interstices at a surface of the pad juxtaposed to the bottom of the tube. Such embedding of the pad may be attained by molding the tube onto the pad during molding of the floor protector. In preferred embodiments, at least the juxtaposed portion of the pad comprises fibrous material, e.g. felt, preferably wool felt.

Preferably the shrinkable tube material is selected, both in terms of its shrinkage characteristics and dimensions, so that the shrunken tube may conform closely to the exterior of the leg and/or foot portion both to provide a desired gripping force and to avoid, at least to some extent, an unsightly result. The floor protector may be transparent so as to be less noticeable. Suitable shrinkable materials include polyurethane, polyolefin, fluoropolymer (such as fluorinated ethylene propylene (FEP), polytetrafluoroethylene (PTFE) or polyvinylidene fluoride (e.g., Kynar™), polyvinylchloride (PVC), neoprene, silicone elastomer and fluoroelastomer (e.g., Viton™).

According to yet another aspect of the present invention, there is provided a floor protector adapted for use on a caster of a caster unit attachable or attached to an item of furniture or other movable objects, the floor protector comprising a tire of shrinkable material that can be shrunk by a predetermined shrinkage ratio by application of heat or by other suitable means, the tire having, at normal room temperatures, a predetermined unshrunk cross-sectional size that allows the tire to be fitted around the circumference of the caster said cross-sectional size and, the shrinkage ratio being such that, when shrunk, the tire will conform to the circumference of the caster and adhere thereto.

According to a still further aspect of the present invention, there is provided a method of installing a floor protector onto a caster of a caster unit attachable or attached to an item of furniture or other movable equipment, comprising the step of fitting over the circumference of the caster an unshrunk tube of shrinkable material, the shrinkable material having a shrinkage ratio such that, when shrunk, the tire will conform to the caster and adhere thereto, the method further comprising shrinking the tire by application of heat or by other suitable means at least until the tire has conformed to the underlying surface of the caster to such an extent as to secure the floor protector to said underlying surface.

Preferably, the shrinkable tire is made of so-called heat-shrink tubing material which shrinks when heated, for example polyurethane, polyolefin, fluoropolymer (such as fluorinated ethylene propylene (FEP), polytetrafluoroethylene (PTFE) or polyvinylidene fluoride (e.g., Kynar™), polyvinylchloride (PVC), neoprene, silicone elastomer and fluoroelastomer (e.g., Viton™).

The unshrunken tire may have a width that is greater than the axial width of a rim portion of the caster to such an extent that, when the tire has been shrunken, opposite margin portions of the shrunken tire form flanges that extend radially inwards to engage respective opposite sides of the rim portion of the caster to resist axial movement of the tire relative to the caster.

Some casters have an edge profile that is larger in diameter at the middle than the sides. For example, some casters are generally ball-shaped, or generally barrel-shaped, while others have a circumferential ridge around the middle of the circumferential surface of the caster. The width of the tire may be selected so that, once the tire has been shrunken onto the caster, opposite edge portions of the tire will extend radially-inwardly and resist axial movement of the tire relative to the caster wheel. The heat-shrink material will become denser and stiffer as it is shrunk, so the radially inwardly extending portions will provide a mechanical locking effect to resist removal of the floor protector. Where the caster wheel has such an edge profile, the width of the tire may be great enough for opposite edge portions to extend not only radially inwardly to engage opposite sides of the larger-diameter middle of the caster wheel but less than the width of the caster wheel; i.e., there will be no flanges extending inwards on opposite sides of the rim portion of the caster. Conversely, the tire may be wide enough to conform not only with the sides of the larger-diameter middle of the caster wheel (e.g., ridge, rib or lesser-diameter parts of the barrel-shaped surface) but also extend radially inwards on each of the opposite sides of at least a rim portion of the caster.

At least part of the interior surface of the tire may be provided with an adhesive so that, once the tire has been shrunk onto the caster wheel, the adhesive bonds the tire to the caster wheel and provides additional security against the tire being accidentally dislodged, at least partially. Where the tire comprises heat-shrink material, the adhesive may be a heat-sensitive (hot-melt) adhesive that melts at temperatures similar to those required to shrink the tire; the hot-melt adhesive then being melted (activated) contemporaneously with the shrinking of the tire, conveniently using the same heat source.

Preferably the shrinkable tire material is selected, both in terms of its shrinkage characteristics and dimensions, including thickness, so that the shrunken tire may conform closely to the exterior of the caster wheel, both to provide a desired gripping (e.g. frictional) force and avoid, at least to some extent, an unsightly result. The tire material may be transparent, also for aesthetic reasons.

Further features and advantages of floor protectors embodying the present invention will be set out in the following description of preferred embodiments of the invention, taken in conjunction with the accompanying drawings, which descriptions provided by way of example only.

BRIEF DESCRIPTION OF THE DRAWINGS

In the drawings:

FIG. 6 is a pictorial rear view of a caster unit having two casters of the kind fitted to a furniture leg;

FIG. 7 is a rear view of the caster unit of FIG. 6 showing a narrow tire of shrinkable synthetic plastics material alongside one of the casters prior to installation upon it;

FIG. 8 is a view similar to FIG. 7 with the unshrunken tire placed over the caster;

FIG. 9 is a view similar to FIG. 8 showing the shrinkable tire shrunken onto the caster; and FIG. 10 is a pictorial rear view of the caster with the shrinkable tire installed.

DETAILED DESCRIPTION PREFERRED EMBODIMENTS

Figures 1A, 1B, 1C, 1D:
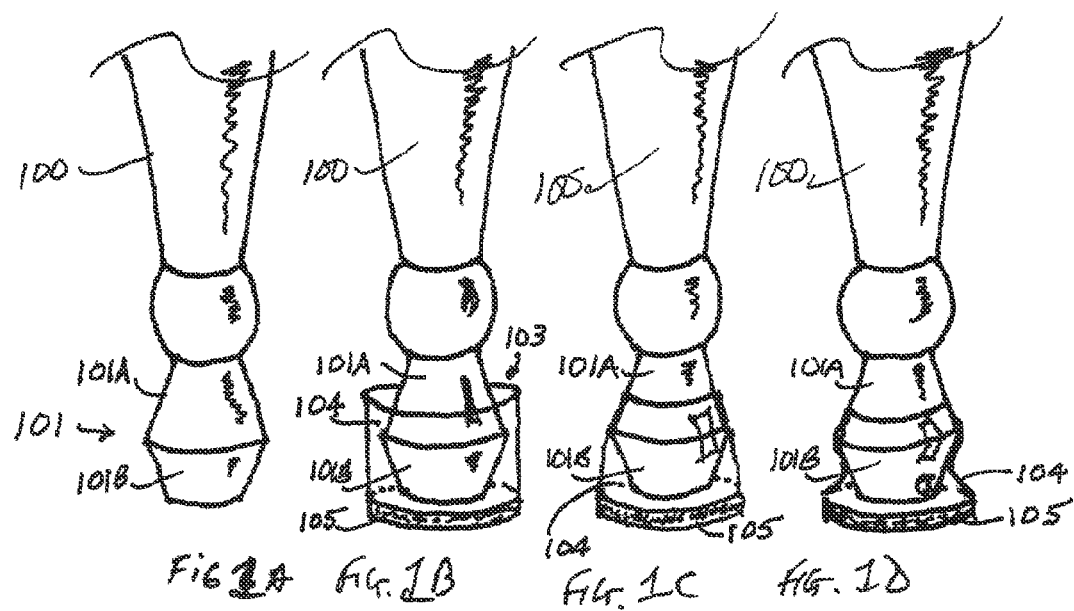
FIGS. 1A, 1B, 1C and 1D are partial perspective views illustrating installation of a floor protector onto the bi-conical foot portion of a furniture leg, the floor protector comprising a shrinkable tube having at one end a protective pad.

Installation of a shrinkable floor protector onto the foot portion of a furniture leg will now be described with reference to FIGS. 1A, 1B, 1C and 1D. FIG. 1A shows a lowermost part of a furniture leg 100 that tapers downwards to end in a bi-conical foot portion 101 formed by an upper truncated conical section 101A which, as shown, will be upright use, and a lower truncated conical section 101B which is shown inverted, as in use. The conical sections are joined at their respective maximum diameter bases. A generally part-spherical intermediate portion 102 connects the upper conical section 101A to the tapered leg above it. The truncated end of the lower conical section 101B normally rests upon the floor (not shown) and if not protected, may leave marks.

FIG. 1B shows a cup-shaped floor protector 103 placed beneath the lower conical section 101B of foot portion 101. The floor protector 103 comprises a cylindrical tube 104 of heat-shrink material having a pad 105 of protective material, for example wool felt, at one end. The pad 105 is shown closing the end of the tube 104 but it is not essential that it do so completely, providing it is securely attached to the end of tube 105. Before shrinking, the diameter of unshrunk heat-shrink tube 104 is greater than the maximum diameter of the conical sections 101A/101B which are received in the tube 105. The length of the heat-shrink tube 104 is significantly greater than the height of the lower conical section 101B so that the application of sufficient heat to the uppermost part of the heat-shrink tube 104 causes the uppermost part to shrink until it securely grips the inclined surface of upper conical section 101A, as shown in FIG. 1C.

In this case, the difference in diameter between the maximum and minimum diameters of the lower conical section 101B, and the diameter of the pad 105, mean that it is not practical for the shrunken heat shrink tubing 105 to conform to more than a small part of the surface of the lower conical section 101B. Nevertheless, appropriate heating of the lowermost part of tube 104 causes it to reduce in diameter and securely grip the pad 105 and the upper part of the surface of lower conical section 101B to provide a degree of stability to the protection pad 105 without damaging the joint between the pad 105 and the end of tube 104.

The grip between the heat-shrink tube 104 and the foot portion 101 may be enhanced by applying adhesive, preferably to the interior surface of tube 104 before installation, conveniently during manufacture.

Figures 2A, 2B, 2C, 2D:
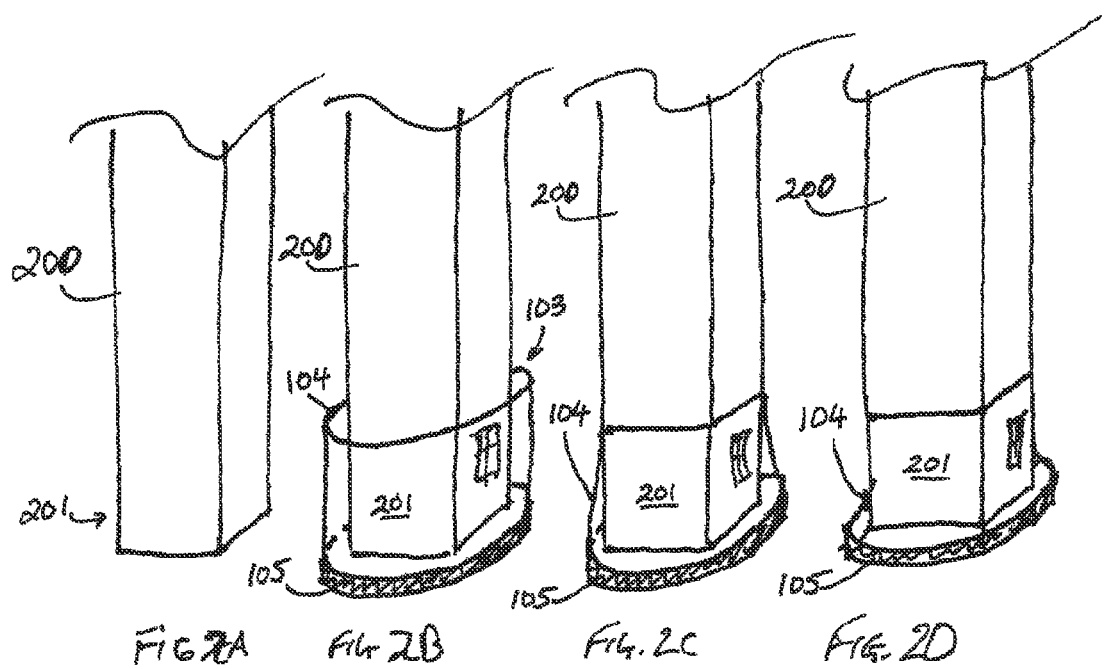
FIGS. 2A, 2B, 2C and 2D are partial perspective views corresponding to FIGS. 1A, 1B, 1C and 1D, respectively, but illustrating installation of such a floor protector onto a straight-sided foot portion of a furniture leg.

An advantage of using heat-shrink material for tube 104 is that, as it shrinks, it will generally conform itself to the shape of the foot portion onto which it is being fitted. and grip the surface of the foot portion with significant friction. Consequently, it is envisaged that the same floor protector 103 may be fitted upon legs or foot portions having uniform surfaces and non-circular cross-sectional shapes. Thus, by way of example, FIGS. 2A, 2B, 2C and 2D are views corresponding to FIGS. 1A, 1B, 1C and 1D but of the same floor protector 103 being installed onto the foot portion 201 of a square-section furniture leg 200 which has straight parallel sides. The floor protector 103 is similar to that of FIGS. 1A-1D and, when shrunken onto the foot portion of leg 200 as shown in FIG. 2D, relies upon friction between the tube 104 and the underlying surface of foot portion 200 to hold the pad 105 securely onto the end of leg 200 and prevent it from dislodging in normal use of the object/furniture. In this case, it may be especially desirable to provide adhesive on the interior surface of tube 104, as described above with respect to tube 104 shown in FIGS. 1B-1D. The adhesive may be a heat-sensitive (hot-melt) adhesive preferably with a melting temperature similar to that used to shrink the tube 104 so that the activation of the adhesive will take place while the tube 104 is being shrunk onto the foot portion 101, i.e., using the same heat source.

In each of the foregoing embodiments of the invention, the material of the pad 105 may be chosen according to the particular situation in which the object/furniture will be used. For example, wool felt may be preferred where the furniture is likely to be used on hardwood flooring, or where noise may be a problem, as in schools. Wool felt or other fibrous material also may be preferred for its ability to allow adhesive to penetrate into the interstices between fibers and provide or improve adhesion and strength. The radial end surface of tube 104 and/or the end portion of tube 104 (if it extends around the pad 105) may be provided with indentations, perforations or other formations to improve adhesion of the pad 105.

Preferably, the surface of the pad 105 which is juxtaposed to the bottom of the tube 104, i.e., which is its upper surface when in use, has interstices into which the hot thermoplastic material (forming the end of tube 104) can flow during molding, the pad 105 being used like a mould insert. (It has been found that 100% wool felt is suitable when the thermoplastic material is PVC or polyolefin). Once the thermoplastic material cools and sets the pad 105 remains permanently embedded, partially, in the end of tube 104. It should be noted that, when such partial embedding is used, the end of the tube need not be completely closed. An annular end surface can provide sufficient area to embed and attach the pad 105 securely.

Heat-shrink materials presently readily available may be shrunk using hot air supplied by, for example, a small butane torch, a heat gun, an electric hot air paint stripper, a commercial (high temperature) hair drier, or other suitable heat source. Use of a domestic hair dryer or other heat source is not precluded if it can provide the required flow of air at a sufficiently high temperature. The choice of heat source will depend upon the characteristics of the heat-shrink material and the sizes of the floor protector and furniture leg foot portion. Heat-shrink tubing is available in a variety of sizes and chemical compositions, with different heat requirements. Some examples are: polyolefin, fluoropolymer (such as fluorinated ethylene propylene (FEP), polytetrafluoroethylene (PTFE) or polyvinylidene fluoride (e.g., Kynar™), polyvinylchloride (PVC), neoprene, silicone elastomer and fluoroelastomer (e.g., Viton™).

A specific example of such a floor protector would be a 2" diameter by 2" length cylindrically-shaped sleeve composed of shrinkable clear PVC with a shrinkage ratio 2:1 easily conforming to square furniture leg of 1¼" width. In this case an adhesive used inside the floor protector would have a composition resistant to plasticizers, based on polyamides in order to glue the PVC. The felt pad at the bottom could be ¼" thick by 2" in diameter or less if it is desired that the felt match the shrunken size rather than the unshrunken size.

It should be appreciated that heat-shrink material used for insulating electrical conductor splices and terminations is tubular and formed by extrusion, which requires lower temperatures (e.g. about 80° C.) than injection molding temperatures (e.g. 100-150° C.) because the extruded tube must be firm enough to pull while the injected plastics material must be viscous enough to flow. However, it is possible to injection-mold PVC and polyolefin using a lower injection temperature and higher injection pressure, especially with simple shapes such as a small cylindrical shape (as in embodiments of the invention) where the molten material has a simple path to follow in order to fill the mold.

An advantage of floor protectors embodying the present invention is that they do not rely primarily upon elasticity of the heat-shrink material of tube 104 being sufficient for it to be stretched during installation and then grip the furniture leg elastically to retain the floor protector in place; rather, embodiments of this invention rely upon the unshrunk heat-shrink material tube 104 being sized to fit easily onto the foot portion, which allows easy installation, and being capable of being shrunk to such an extent that it conforms closely to the underlying surface of the furniture leg foot portion, whereupon inherent tackiness or striation of the heat-shrink material provides good frictional engagement. The security of the installation is further improved where the contour or profile of the underlying leg surface is not straight, so conformance of the shrunken tube to the foot portion provides additional mechanical locking, particularly since the more the heat-shrink material is shrunk, the more inelastic it becomes; and yet further improved by using an adhesive. It is envisaged that the shrinkable tube 104 could be shrunk onto both the pad 105 and the foot portion 101, in which case the pad 105 might be stepped so that a central portion protrudes beyond the end of the tube to contact the floor when the floor protection is in use.

It is preferred, however, to mould the floor protector 104 as a single, unitary component, similar to heat-shrink end caps for insulating electrical conductor ends, and to select the plastics material and pad material so that the viscosity of the former and the interstices of the latter facilitate infusion of the molten plastics material into the interstices of the pad to embed the pad 105 partially into the heat-shrink material during molding.

There is a trade-off between the thickness and shrinkage ratio of the heat-shrink material, which thickens as it shrinks. A shrinkage ratio of 2:1 is preferred so that the final thickness of tube 104 is not too great. Nevertheless, a shrinkage ratio of 3:1 of 4:1 might allow a single size of floor protector to be used with a wider range of sizes of foot portion 101 and would likely be clearer (when transparent).

Figure 3B:
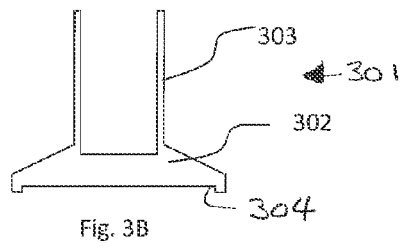
FIG. 3B illustrates a plastics preform at a first stage in the production of the floor protector of FIG. 3A.
Figure 3A:
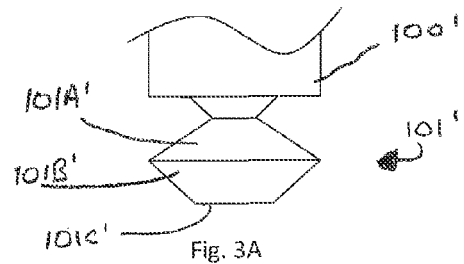
FIG. 3A illustrates a bi-conical foot of a furniture leg to which the floor protector is to be attached.

For some applications, such as the saucer-shaped bi-conical foot portion 101' shown in FIG. 3A, it would be difficult to mould a floor protector having a closed cylindrical shape with both the tubular portion and the integral base or bottom portion having the same shrinkage ratio. Since the base portion is to accommodate a pad of protective material, it is desirable for the base portion to shrink very little during installation. Consequently, a preferred method of manufacturing a heat-shrinkable floor protector addresses these issues by molding, preferably injection-molding, a preform of heat-shrink material which has a base that is approximately the finished size for a particular installation and an integral tubular portion or sleeve that is undersized relative to the foot portion it must accommodate during installation, and then stretches the tubular portion to a desired shape and size to accommodate the foot portion.

Referring to FIGS. 3A-3F, a first step is to mould, preferably using injection-molding, a preform 301 of heat-shrink plastics material having a base 302 that is approximately the size required when the floor protector is installed and an integral tubular portion 303 protruding from one side which, in use, will be uppermost. The base 302 has a recess 304 in its underside, i.e., that faces downwards when in use, to receive a pad 305 of protective material (see FIG. 3E), which may be glued into the recess 304 after molding of the floor protector or bonded to the base 302 during molding, by percolation of the molten plastics material into interstices in the pad 305, as previously described.

Figure 3C:
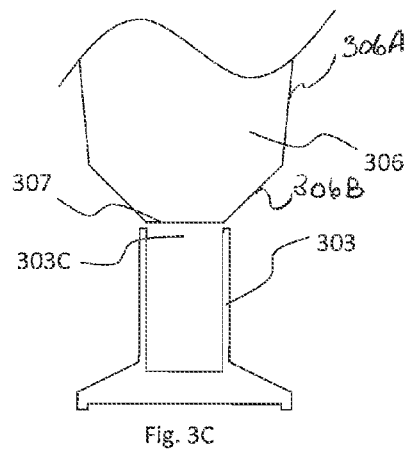
FIG. 3C illustrates a stretching tool prior to insertion into a tubular part of the preform.

The tubular portion 303 is significantly smaller than needed to accommodate the foot portion 101 so it is stretched by application of heat and insertion of a molding tool 306, shown in FIG. 3C, having a two conical sections, a larger-diameter section 306A having a smaller conical angle and a smaller-diameter section 306B having a larger conical angle.

Where the two conical sections 306A and 306B meet, the diameter is comparable to the maximum diameter of the conical foot portion 101'.

The conical portion 306A serves as an insertion tip to fit into the mouth of the unstretched tubular portion so it tapers to a truncated surface 307 that is similar in diameter to the truncated base 101C' of conical foot portion 101' (FIG. 3A). Preferably, the diameter of truncated surface 307 of tool 306 is slightly greater than the diameter of the bottom surface 101C of the truncated foot portion 101B and matches a finished size of the interior surface 302B of the bottom 302 of the floor protector 300. While the preform 301 is still hot enough to be sufficiently pliable yet cool enough to maintain its shape, the molding tool 306 is inserted into the cylindrical sleeve 303. First, the insertion tip portion 306B is inserted into the sleeve opening or mouth 303C and the wider portion 306A opens the tubular portion until it is wide enough to accept the foot portion 101B (FIG. 3A).

Figure 3D:
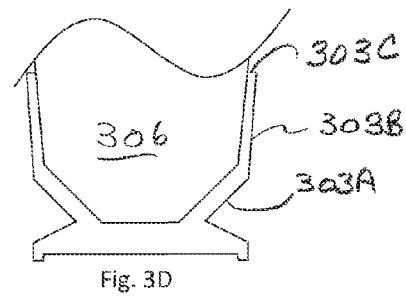
FIG. 3D illustrates the stretching tool fully inserted into the tubular part.

Once the stretching mould tool 306 has been fully inserted, as shown in FIG. 3D, the preform unit is allowed to cool fully to prevent the stretched tubular sleeve portion 303B from shrinking back to its original size prematurely. The mould tool 306 is removed and the unit now maintains its new shape. The tapering of the larger-diameter section 306A of the tool 306 makes it easier to remove the tool 306 after the tubular portion has been stretched.

The felt pad 305 can either be affixed after the first or second molding process using an adhesive to permanently bond the two together. Another option would be to place the felt pad into the mould prior to the first injection molding process so the felt pad is permanently embedded into the plastic base using an over-molding process.

As illustrated in FIG. 3D, after the stretching step, the base portion 304 has not stretched by any significant amount but the tubular portion 303 has stretched in conformity with the tool 306. Thus, the stretched tubular portion 303 now has a first or lower (in use) truncated conical portion 303A diverging from the base 302 and a second or upper (in use) portion 303B diverging, with a smaller angle of divergence, from the conical portion 303A to the mouth 303C of the tubular portion and, hence, the floor protector.

Figure 3E:
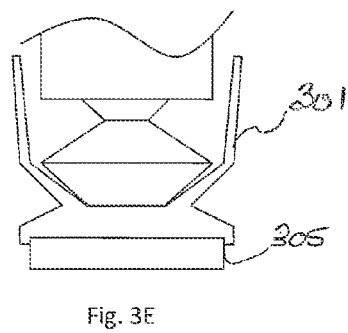
FIG. 3E illustrates the bi-conical foot portion inserted into the stretched tubular portion of the floor protector prior to shrinking.
Figure 3F:
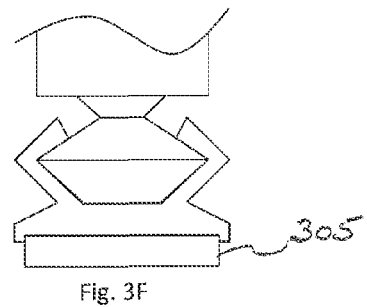
FIG. 3F illustrates the floor protector and bi-conical foot portion after shrinking of the tubular portion onto the bi-conical foot portion.

As shown in FIG. 3E, the floor protector 301' can be installed by inserting the swivel glide leg 101 (or any other leg that fits into the floor protector, into the tubular portion or sleeve 303B until the bottom of the glide 101C abuts the interior surface of the base 304 and applying heat. Because the base 302 has not been stretched it will not shrink and affect the felt pad 305 appreciably. As shown in FIG. 3F, the tubular portion will shrink into conformity with the bi-conical glide 101. More particularly, the upper (as shown in FIG. 3F) tubular portion 303B will shrink onto the upper (in use) surface of portion 101A of the glide and, once cooled, will provide a strong mechanical bond with the glide making it extremely difficult, if not impossible, to remove the floor protector by hand.

Figure 4:
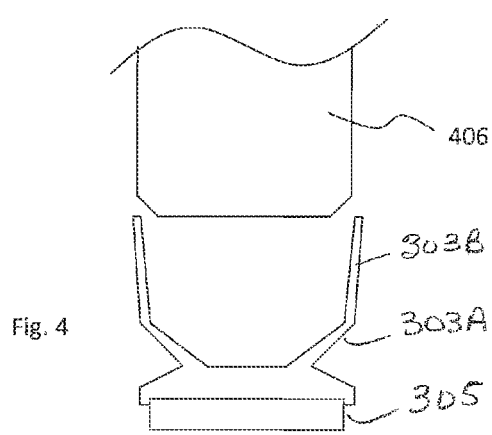
FIG. 4 illustrates an optional additional stretching step using a more cylindrical tool to form a flatter base.

If a floor protector is to be used with a foot portion having a wider, flatter end portion, an additional molding step could be employed. Thus, as illustrated in FIG. 4, once the tubular portion 303 has been stretched using the tool 306, and the preform is still hot enough, a more-cylindrical mould insert 406 is inserted to flatten and widen the conical portion 303A to create a flatter base.

Figure 5:
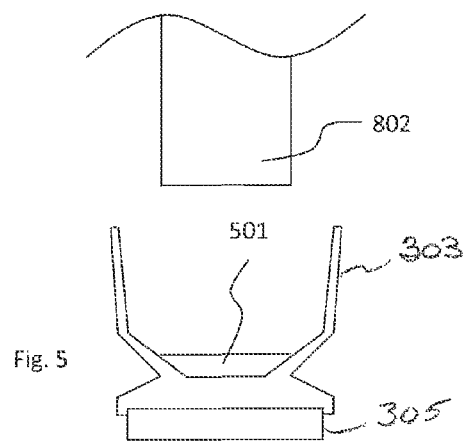
FIG. 5 illustrates a floor protector having adhesive applied to the interior surface of the bottom of the floor protector.

It is envisaged that, following molding and stretching, but before installation of the floor protector, adhesive 501 might be applied inside the bottom of the tubular portion 303, as indicated at 502 in FIG. 5. Once the floor protector was installed, the adhesive would glue the base 302 to the bottom of the foot portion and improve security of the installed floor protector, especially when installed on a smooth cylindrical leg 503. It will be appreciated that floor protectors may need to be removed, when worn or damaged, and replaced, so it would be desirable not to use such adhesive to glue the sides of the tubular portion to the sides of the leg so as to avoid damage to the leg when the floor protector is being removed. The adhesive could, of course, be a hot-melt adhesive and be activated by the heat applied to shrink the floor protector tubular portion/sleeve.

It is also envisaged that a floor protector having a conical cavity at the bottom of the tubular portion could be installed onto furniture leg having a squared end, as shown in FIG. 5, without any intervening adhesive, or with insufficient adhesive to fill the cavity between the base 302 and the end of the furniture leg 503. As the tubular portion shrinks onto the surface of the leg, and forms a seal, an air pocket will be formed in the space which, in FIG. 5, would be occupied by adhesive 501. The air pocket would serve as a shock absorber.

Application of a heat-shrink floor protector to a caster of a caster unit attached or attachable to a movable item will now be described with reference to FIGS. 6-10. FIG. 6 shows a typical caster unit 601 having two casters 602A and 602B on a common axle (not shown) supported by a support member 603 itself carried by a swivel 604 which, in use, will allow the support member 603 to rotate about a generally vertical swivel axis. As shown, the swivel 604 comprises a spigot for attachment to the foot portion of a furniture leg for example the leg of an office chair (not shown), typically by insertion into a complementary socket in the end of the leg. Alternatively, the swivel 604 may comprise a flat plate having screw holes for attachment to the end of a furniture leg, to the underside of a cabinet, and so on. As is customary, the axis of swivel 604 is eccentric to the rotation axis of the common axle so that the caster unit 601 can swivel around the swivel axis as the furniture or other object is moved. For convenience, the following description is of one tire being fitted to caster 602A, but it will be understood that a similar tire would usually be fitted, in the same manner, to caster 602B.

Thus, FIG. 8 shows the same caster unit 601 with a floor protector in the form of a tire 605 of shrinkable thermoplastic material, specifically a short piece of heat-shrink tubing, alongside caster wheel 602A. The shrinkage ratio and cross-sectional size, i.e., diameter, of the tire 605 are chosen so that, unshrunken, it is large enough to fit around the circumference of the caster 602A, possibly with a little stretching; but once it has been shrunk, the tire 605 grips the circumference of the caster 602A firmly and securely enough that it will not be dislodged readily during normal usage.

The majority of commercial office casters are from 1.75" to 2.25" in diameter and it has been found that a suitable tire 605 could be cut from a tube of shrink material 2.25" in diameter and from 1 mm to 2 mm thick. The thickness is quite important, since a thinner tire will be easier to install onto the caster wheel, but will wear down more quickly when in use. A shrinkage ratio of 2:1 means, theoretically, that a tire having a diameter of 2.25" before shrinking could grip a caster as small as 1.125" in diameter when shrunken. For better grip, however, it would be possible, and might be preferable, to use shrinkable tubing material having a 3:1 or 4:1 shrinkage ratio. Also, a greater shrinkage ratio, such as between 3:1 and 4:1, might allow one size of shrinkable tubing tire to fit several sizes of caster.

It has also been found that, for a caster having a width of ⅜" inch, cutting the shrink tubing into bands (tires) that are ¾" wide allows for marginal flanges 606 for engaging the opposite sides of the caster to resist sheer forces when the caster is rolling with a person's weight applied to the caster.

As shown in Figure, which shows the tire 605 in place around the caster 602A, the width $W_t$ of the tire 605 is greater than the width $w_c$ of the caster 602A so that, when the tire is centered, equal margin portions overhang the caster on opposite sides of its rim portion. When the tire 105 has been shrunk onto the caster 102A, and the medial portion of the tire 105 is in contact with the circumferential surface of the caster 102A, the opposite margin portions 106 of tire 105 form flanges extending radially inwards to grip the respective opposite side faces of the rim portion of the caster 102A, as shown in FIGS. 14 and 15. In this condition, the heat-shrink material of the shrunken tire 105 is relatively inelastic and the flanges 106 mechanically resist forces tending to dislodge the tire 105 from the caster 102A.

Some caster units have casters which are not discs of constant diameter, i.e., they may be ball-shaped or barrel-shaped, or have at least one circumferential ridge extending around the middle of the circumferential surface of the caster. In such a case, the tire 105 may not need to be wider than the caster 102A, providing it conforms to the circumferential surface each side of its maximum diameter, and/or, where applicable, the opposite sides of the ridge, and mechanically resists axial movement of the tire 105. On the other hand, the tire 105 may be wider than the caster so that, when it has been shrunk into conformity with the circumferential surface of the caster to provide some mechanical locking effect, it will also form marginal flanges 106 to engage opposite sides of the rim portion of the caster, as previously described, and provide additional security against the tire 105 being dislodged.

If desired, heat-sensitive (hot-melt) adhesive can be provided on the interior of the unshrunken tire 105. The adhesive may be selected so that the heat required to shrink the tire 105 onto the rim of the caster 102A will be sufficient to melt or activate the heat-sensitive (hot-melt) adhesive contemporaneously. Compositions resistant to plasticizers, usually based on polyamides, are needed for gluing PVC. There are also many low temperature hot melt adhesives that could be used if heat shrink materials other than PVC are used. The adhesive provides additional security against the tire 105 being dislodged during normal use. It may be preferable for the adhesive to be transparent when set, especially when used with a transparent tire 105. The shrinkable material may also include a UV stabilizer, especially if the object is to be used outdoors or otherwise exposed to sunlight and especially if the tire is transparent.

In some cases, it may be possible to select the heat-shrink material of the tire and the material of the circumference of the caster so that the applied heat not only causes the tire 105 to shrink but also causes either or both of the materials at the interface between the caster and the tire to melt and bond (weld). Once the caster and tire cool, they will be bonded together without the use of a separate adhesive applied to the inner surface of the tire.

It is envisaged that the use of adhesive, or heating until one or both of the juxtaposed surfaces of the tire and wheel melt(s) and bond(s) or weld(s), might be particularly desirable if the width of the tire 105 were less than the width of the caster, especially if the caster had a constant diameter.

Although the caster unit 101 shown in FIGS. 6 to 10 is of the type in which the swivel 104 has a spigot for insertion into a socket in the furniture leg, the invention embraces floor protection for other types of caster unit, such as those in which the support member is attached by a bearing to a flat plate having screw-holes enabling it to be attached, by screws or bolts, to the underside of the foot of a furniture leg or underside of a cabinet, and so on.

Heat-shrink materials presently readily available may be shrunk using hot air supplied by, for example, a small butane torch or heat gun, an electric hot air paint stripper, a commercial (high temperature) hair drier, or other suitable heat source. The choice of heat source will depend upon the characteristics of the heat-shrink material and the size of the caster. The heat will be applied evenly and be maintained at least at 100° C. for PVC tubing or 80° C. for polyolefin, for example. A variety of heat-shrink materials are commercially available at this time, most of them in the form of (extruded) tubing which can be cut to length to form an unshrunk tire 105. Examples include polyurethane, polyolefin, fluoropolymer (such as fluorinated ethylene propylene (FEP), polytetrafluoroethylene (PTFE) or polyvinylidene fluoride (e.g., Kynar™), polyvinylchloride (PVC), neoprene, silicone elastomer and fluoroelastomer (e.g., Viton™).

PVC is preferred for some embodiments of the present invention as applicable to casters because it is less affected by ultraviolet radiation, so the casters would be more suitable for use outdoors. Also, PVC is generally harder and more abrasion-resistant. Polyolefin might be preferred, however, where it is desirable/necessary to use a heat source delivering lower shrink temperatures.

It should be appreciated that heat-shrink material that is presently available commercially is formed by extrusion, which requires lower temperatures (e.g. less than about 80° C.) than injection molding temperatures (e.g. 100-150° C.) because the extruded tire tubing must be firm enough to pull whereas the injected plastics material must be viscose enough to flow.

On the other hand, if neither adhesive is used, nor thermal bonding (welding) is used, the tires could be replaced more easily, when worn, simply by cutting them off.

Although it is preferred to use PVC heat-shrink material in embodiments of the present invention, it should be noted that other shrinkable materials might be used instead, according to their specific composition and characteristics and suitability for particular floor protector applications. Known heat-shrink tubing is manufactured from thermoplastic material including, for example, polyurethane, polyolefin, fluoropolymer (such as fluorinated ethylene propylene (FEP), polytetrafluoroethylene (PTFE) or polyvinylidene fluoride (e.g., Kynar™), polyvinylchloride (PVC), neoprene, silicone elastomer and fluoroelastomer (e.g., Viton™).

It is known to use heat-shrink tubing and heat-shrink end caps in the electrical industry around connections between electrical conductors and terminals, to provide insulation, abrasion resistance and environmental protection. Heat-shrink materials may shrink to as little as one third or one quarter of their original size and may shrink at temperatures which can be obtained using a heat source that is relatively readily available, such as a small butane torch, an electrical hot air paint-stripper or a hair dryer. Generally, professional- or commercial-grade hair driers would be preferred because domestic hair driers operate at lower air temperatures and/or flow rates than commercial hair driers, which limits their use with heat-shrink materials that are commercially available at this time. Nevertheless, use of a domestic hair dryer or other heat source is not precluded if it can provide the required flow of air at a sufficiently high temperature.

It should be appreciated that there are different kinds of heat-shrink material. Some such materials contain many monomers which polymerize when the tubing is heated. As the monomers cross-link and occupy less space, the density of the material increases and the volume of the material shrinks. On the other hand, so-called expansion-type heat-shrink materials comprise polymers and are stretched physically to the expanded or "unshrunk" state. Application of heat causes the polymers to "relax" and the material to shrink.

Floor protectors embodying the present invention may overcome problems with known floor protectors for casters which are so thick that they may prevent the caster from rolling freely and much too difficult to install as a lot of force is required in order to slide the protector over the caster.

The invention claimed is:

1. A floor protector having a tubular portion sized to fit onto a leg portion of a furniture leg or a circumferential surface of a caster of a caster unit attached or attachable to a movable item, said tubular portion comprising shrinkable material having a shrinkage ratio such that, when shrunken by the application of heat or ultraviolet radiation or by other means, the tube grips the leg or caster to secure the floor protector thereto.

2. A floor protector adapted for use with furniture having at least one leg with a foot portion, the floor protector comprising:
   a tube of shrinkable material that can be shrunk by application of heat or other suitable means;
   the tube having at normal temperatures a predetermined unshrunk cross-sectional size large enough to permit the tube to receive said foot portion and a shrinkage rate sufficient for the tube to be shrunken to a cross-sectional size that is smaller than the foot portion so that, when the tube is placed over the foot portion and shrunk by application of heat or other suitable means, the tube will conform to and adhere to the underlying foot portion and secure the floor protector to the foot portion.

3. A floor protector according to claim 2, wherein the tube is partially or completely closed at one end portion and said end portion carries a partially-embedded pad of protective material having interstices, the unshrunk tube having a length predetermined to provide, when shrunk onto the furniture leg, a frictional force between the tube and the foot portion sufficient to hold the pad onto the foot portion, the material of the end portion of the tube penetrating into said interstices to secure the pad permanently to the tube.

4. A floor protector according to claim 3, wherein the pad comprises at least one or a mixture of two or more of polyester, wool, nylon, rayon, polytetrafluoroethylene, and cotton.

5. A floor protector according to claim 3, wherein the tube is partially or completely closed at one end portion and said end portion carries a partially-embedded pad of protective material having interstices,
   the material of the end portion of the tube penetrates into said interstices to secure the pad permanently to the tube,
   the unshrunk tube has a length predetermined to provide, when shrunk onto the furniture leg, a frictional force between the tube and the foot portion sufficient to hold the pad onto the foot portion, and
   the pad comprises at least one of, or a mixture of two or more of, polyester, wool, nylon, rayon, polytetrafluoroethylene, and cotton.

6. A floor protector according to claim 3, wherein the pad comprises wool felt.

7. A floor protector according to claim 2, wherein the shrinkable material has a shrinkage ratio of about 2:1.

8. A floor protector according to claim 2, wherein the tube is partially or completely closed at one end portion and said end portion carries a partially-embedded pad of protective material having interstices, the unshrunk tube has a shrinkage ratio of about 2:1 and a length predetermined to provide, when shrunk onto the furniture leg, a frictional force between the tube and the foot portion sufficient to hold the pad onto the foot portion, and the material of the end portion of the tube penetrates into said interstices to secure the pad permanently to the tube.

9. A floor protector according to claim 2, wherein the tube is partially or completely closed at one end portion and said end portion carries a partially-embedded pad of protective material having interstices,
   the material of the end portion of the tube penetrates into said interstices to secure the pad permanently to the tube,
   the unshrunk tube has a length predetermined to provide, when shrunk onto the furniture leg, a frictional force between the tube and the foot portion sufficient to hold the pad onto the foot portion, and
   the pad comprises at least one of, or a mixture of two or more of, polyester, wool, nylon, rayon, polytetrafluoroethylene, and cotton.

10. A floor protector according to claim 2, wherein the tube is partially or completely closed at one end portion and said end portion carries a partially-embedded pad of protective material having interstices,
    the material of the end portion of the tube penetrates into said interstices to secure the pad permanently to the tube,
    the unshrunk tube has a shrinkage ratio between 2:1 to 4:1 and a length predetermined to provide, when shrunk onto the furniture leg, a frictional force between the tube and the foot portion sufficient to hold the pad onto the foot portion, and
    the pad comprises at least one of, or a mixture of two or more of, polyester, wool, nylon, rayon, polytetrafluoroethylene, and cotton.

11. A floor protector according to claim 2, wherein said pad is circular with planar top and bottom surfaces.

12. A floor protector as claimed in claim 2, wherein said pad includes a central aperture.

13. A floor protector according to claim 2, wherein the end of the tube to which the pad is attached has a central aperture.

14. A floor protector according to claim 2, wherein at least part of the interior of the unshrunk tube is provided with a heat-sensitive (hot-melt) adhesive arranged to melt at temperatures such that the adhesive will be melted contemporaneously with the shrinking of the tube and, once the tube has been shrunk onto the foot portion, the adhesive will bond the tube to said end foot portion.

15. A floor protector according to claim 2, wherein the shrinkable material comprises a heat-shrinkable thermoplastic material selected from a group including polyurethane, polyolefin, fluoropolymer, polytetrafluoroethylene (PTFE) or polyvinylidene, polyvinylchloride (PVC), neoprene, silicone elastomer and fluoroelastome.

16. A floor protector according to claim 2, wherein the shrinkable material has a shrinkage ratio of at least 3:1.

17. A floor protector according to claim 2, wherein the tube is partially or completely closed at one end portion and a pad of protective material is attached to the end portion by adhesive.

18. A floor protector adapted for use on a caster of a caster unit attached or attachable to an item of furniture or other movable object comprises a tire of shrinkable material that can be shrunk by a predetermined shrinkage ratio by application of heat or by other suitable means, the tire having, at normal room temperatures, a predetermined unshrunk cross-sectional size that allows the tire to be fitted around the circumference of the caster, the cross-sectional size and the shrinkage ratio being such that, when shrunk, the tire will conform to the caster and adhere thereto.

19. A floor protector according to claim 18, wherein the unshrunk tire has a width selected so that, when the tire has been shrunken onto the caster, opposite margin portions of the shrunken tire extend radially inwards to engage respective opposite edge portions of opposite sides of a rim portion of the caster and provide mechanical resistance against axial movement of the tire relative to the caster.

20. A floor protector according to claim 19 comprising a circumferential surface having a profile with a medial portion greater in diameter than marginal portions, the unshrunk tire having a width such that, when the tire has been shrunken onto the caster, the tire conforms to surfaces of the caster each side of its maximum diameter to provide mechanical resistance to axial movement of the tire relative to the caster wheel.

21. A floor protector according to claim 18 comprising a circumferential surface having a profile with a medial portion greater in diameter than marginal portions, the unshrunk tire having a width such that, when the tire has been shrunken onto the caster, the tire conforms to surfaces of the caster each side of its maximum diameter to provide mechanical resistance to axial movement of the tire relative to the caster wheel.

22. A floor protector according to claim 21 comprising a circumferential surface having a stepped profile providing a larger diameter central section and smaller diameter sections either side of the central section defining shoulders between the central section and the smaller diameter sections, the size and shrinkage ratio of unshrunk tire being such that, when the tire has been shrunken onto the caster, parts of the tire engage respective shoulders to provide mechanical resistance against axial movement of the tire relative to the caster.

23. A floor protector according to claim 21 comprising a circumferential surface having a barrel-shaped profile, the size and shrinkage ratio of the unshrunk tire being selected so that portions of the shrunken tire either side of a maximum diameter of the caster will grip underlying lesser diameter surfaces of the caster wheel to provide mechanical resistance to axial movement of the tire relative to the caster.

24. A floor protector according to claim 18, wherein said shrinkable material is heat-shrinkable and at least part of the interior of the floor protector is provided with a heat-sensitive (hot-melt) adhesive arranged to melt at temperatures required to shrink the heat-shrinkable material such that the adhesive will be melted contemporaneously with the shrinking of the tire, and adhere the shrunken tire to said caster.

25. A floor protector according to claim 18, wherein the shrinkable material comprises a thermoplastic material, for example polyurethane, polyolefin, fluoropolymer, polytetrafluoroethylene (PTFE) or polyvinylidene fluoride, polyvinylchloride (PVC), neoprene, silicone elastomer and fluoroelastomer.

26. A floor protector according to claim 18, wherein the shrinkable material is heat-shrinkable and both the heat-shrinkable material and a circumferential surface of the caster have melting points such that application of heat not only shrinks the tire onto the caster but also causes the interior surface of the tire and underlying surface of the caster to fuse together and, once cooled, bond the tire to the caster.

27. A floor protector for attachment to a foot portion of an item of furniture or other moveable item, or to a caster of a caster unit attached or attachable to an item of furniture or other movable item, the floor protector comprising a tube of heat-shrinkable material having, at normal room temperatures a cross-sectional size sufficient to fit onto said foot portion or caster, and a shrinkage ratio such that, when shrunken, the tube will grip the foot portion or caster, at least part of the interior of the tube being provided with heat-sensitive or hot-melt adhesive that will melt at temperatures required to shrink the tube onto the foot portion or caster, such that the adhesive will melt contemporaneously with the shrinking of the tire and, when cooled, adhere the shrunken tire to said foot portion or caster.

* * * * *